US006612078B2

(12) United States Patent
Hawang

(10) Patent No.: US 6,612,078 B2
(45) Date of Patent: Sep. 2, 2003

(54) BOARDS COMBINATION STRUCTURE

(75) Inventor: James Hawang, Taipei (TW)

(73) Assignee: Kenmark Industrial Co., Ltd., Taipei (TW)

( * ) Notice: Subject to any disclaimer, the term of this patent is extended or adjusted under 35 U.S.C. 154(b) by 0 days.

(21) Appl. No.: 09/973,897

(22) Filed: Oct. 11, 2001

(65) Prior Publication Data

US 2003/0070381 A1 Apr. 17, 2003

(51) Int. Cl.[7] .................................................. E02F 9/00
(52) U.S. Cl. ........................ 52/36.5; 52/578; 52/582.2; 403/353
(58) Field of Search ................................. 52/36.4, 36.5, 52/578, 582.2, 127.12; 403/326, 329, 331, 353, 219; 312/265.5, 265.6, 263, 257.1

(56) References Cited

U.S. PATENT DOCUMENTS

| 1,055,522 A | * | 3/1913 | Cumming | |
| 1,178,338 A | * | 4/1916 | Niernsee | |
| 1,537,459 A | * | 5/1925 | Campbell | |
| 2,414,060 A | * | 1/1947 | Rausch | 20/4 |
| 3,332,182 A | * | 7/1967 | Mark | 52/127 |
| 3,858,988 A | * | 1/1975 | Cohen | 211/189 |
| 5,116,015 A | * | 5/1992 | Gassaway | 248/205.1 |
| 5,350,250 A | * | 9/1994 | Nagler | 37/468 |

* cited by examiner

Primary Examiner—Carl D. Friedman
Assistant Examiner—Basil Katcheves
(74) Attorney, Agent, or Firm—Bacon & Thomas, PLLC

(57) ABSTRACT

A structure to fast combine two boards into a box or cabinet by means of a snap catch comprised of a catch piece and a strike piece without using any screw, within, the catch piece being incorporated into a first board and provided with catch-hook while the strike plate being incorporated into a second board provided with recess to receive insertion by the catch from the catch piece to couple both boards to each other, laterally or vertically as required.

1 Claim, 12 Drawing Sheets

BOARDS COMBINATION STRUCTURE

BACKGROUND OF THE INVENTION (a) Field of the Invention

The present invention relates to a structure of combining two boards, and more particularly, to one that allows two boards to be fast secured to each other by means of a catch piece and a strike piece respectively mounted to a first and a second boards to ensure a firm and solid combination without being liable for falling apart. By inserting the catch piece into the strike piece and pushing to move the catch piece and both pieces are secured to each other without using any screw or steel nail; meanwhile both boards can be separated whenever required for storage or handling.

(b) Description of the Prior Art

In daily life, many objects, e.g. boxes, cases, cabinets and baskets are used and they are practically made of boards either laterally and/or vertically arranged to form various types of partitions, boxes or cabinets. Most of the boards are incorporated to each other by means of nails, steel nails, tenons, screws, and bolts. When the nails are used, they have to be hammered into a joint where the lateral board meets the vertical board and it is not unusual to see nails popping out of the board to present danger in use. The misplaced nail must be pulled off leaving a trace, which also presents danger to scratch clothes and/or objects or even one's skin. Furthermore, once the boards are nailed in place for use, it prevents from being knocked down. Even the nails are pulled off, dents and cracks left cause damage to the appearance and the structure strength of the boards. Anyway, the boards are prevented from reuse and a renewal is required resulting in waste of resources.

If screws are used to allow their retreat from the boards, a significant spacing is created to prevent a secured locking if the same screw hole is used again. Therefore, boards fail to secure firmly to each other and tend to shake whenever they are used.

Some boxes and cabinets are combined by inserting a thinner board into grooves provided on a thicker one. However, such combination involves insertion only, but without fixation. As a result, the box or the cabinet is not secured to sustain any heavier weight while the thinner one often escapes from the grooves of the thicker one.

Also generally available in the market are some combination boards for DIY and they are usually locked to each other by means of screws, bolts and nuts. However, DIY requires careful reading of the instructions and the proper tools. That could be a challenge too tough for kid, woman and the weak to handle. Even put in the good hand, few mistakes would happen in the course of assembly so all the bunch of screws, bolts, and nuts must be removed and start it all over again. Given with all the time, efforts and patience required, the spacing is left in the screw hole and nothing can do about it. As a result, stability and safety are compromised in use. Many consumers thus reject the idea of DIY boards, and the seller finds the sales goes down and the returned products go up.

SUMMARY OF THE INVENTION

The primary purpose of the present invention is to provide a structure for combination of two boards by having a catch piece provided with at least one catch hook fixed to a first board to be inserted into locking hole in a strike piece fixed to the second board to firmly secure both boards to each other.

Another purpose of the present invention is to provide a structure for combination of two boards that can be repeatedly used by pushing the catch hook out of the locking hole to separate both boards from each other for future combination.

Another purpose yet of the present invention is to provide a structure for combination of two boards that allows adjustment of the numbers respectively of catch hook on the catch piece and the locking hole in the strike piece depending on the size and the length of boards to be combined for a firm insertion and increased support strength of the boards combined.

Another purpose yet of the present invention is to provide a structure for combination of two boards that has respectively fixed the catch piece and the strike piece to the boards so that upon each separation or combination, the consumer will have only to separate or incorporate the catch piece and the strike piece without using any tool and the DIY could be easily done.

Another purpose yet of the present invention is to provide a structure for combination of two boards that has both of the catch piece and the strike piece provided on DIY boards to make the combination easy, thus to effectively promote the sales amount, encourage the buying motif of the consumer and lower the rate of the returned products.

DETAILED DESCRIPTION OF THE PREFERRED EMBODIMENTS

Figure 1:
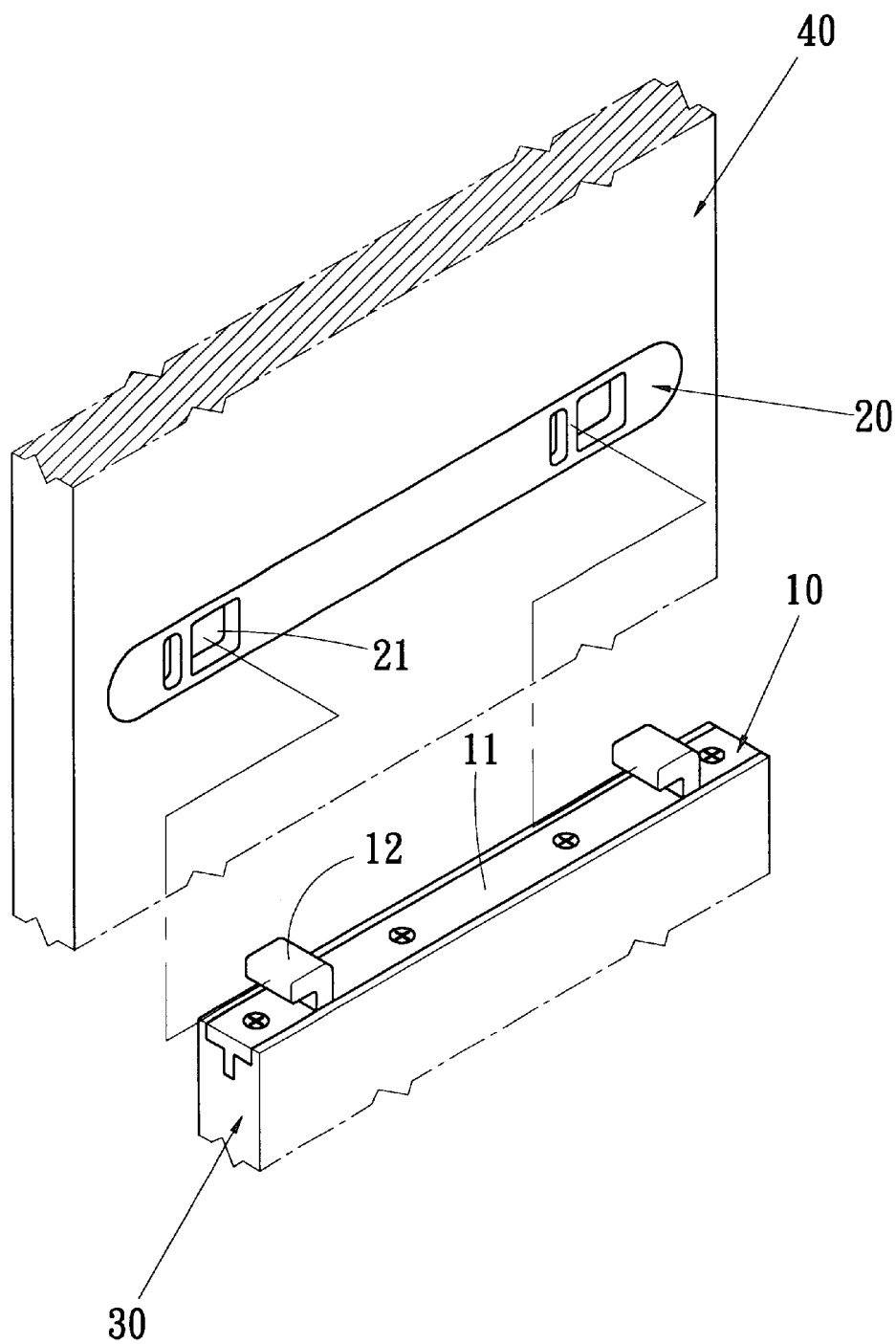
FIG. 1 is an exploded view of a preferred embodiment of the present invention.

As illustrated in FIG. 1, a preferred embodiment of the present invention is comprised of a catch piece (10) secured to a first board (30) and a strike piece (20) secured to a second board (40) for both of the boards (30)(40) to be combined to each other by having the catch piece (10) to be locked into the strike piece (20). Within, said catch piece (10) is fixed to a trough (31) provided in the first board (30) as illustrated in FIG. 2 and multiples of catch hook (12) are provided on a catch plate (11) of the catch piece (10) with each of said catch hook (12) indicating approximately an inverse "L" shape to form a gap (13) between the catch hook (12) and the catch plate (11).

Said strike piece (20) being secured in a recess (41) of the second board (40) (also referring to FIGS. 2 and 3) has provided on its surface multiples of locking hole (21) corresponding to those catch hooks (12) from the catch piece (10) and an accommodation space (22) is provided in the back of each locking hole of the strike plate (20).

Figure 4:
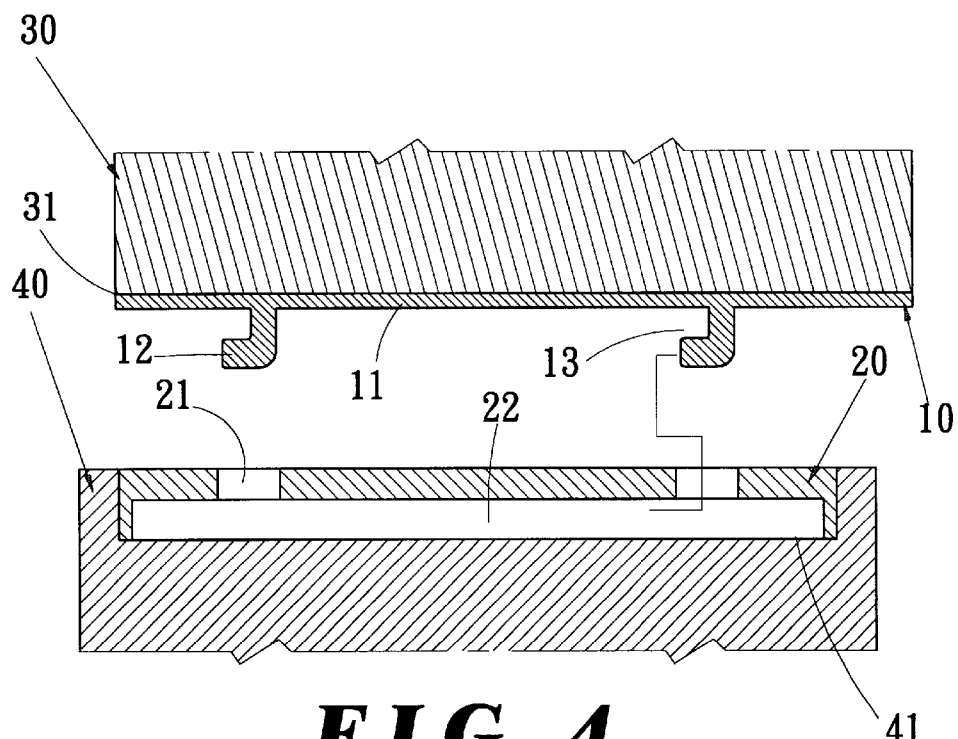
FIG. 4 is a sectional view of the preferred embodiment of the present invention before combination.
Figure 5:
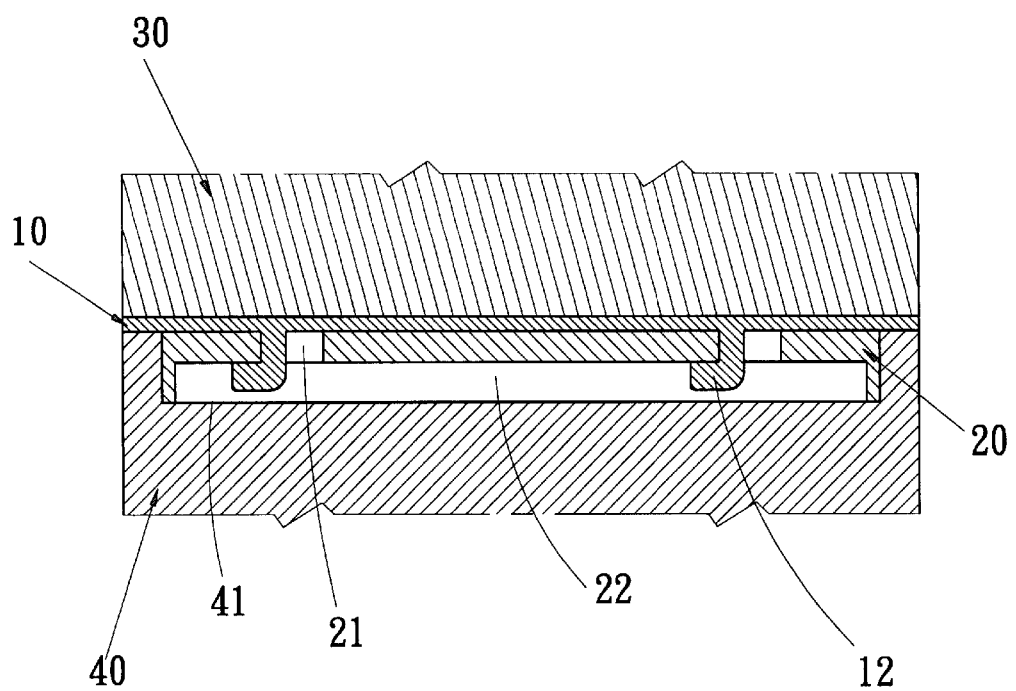
FIG. 5 is a sectional view of the preferred embodiment of the present invention after combination.

When the catch piece (10) and the strike piece (20) are respectively secured to the first board (30) and the second board (40), those catch hooks (12) from the catch piece (10) are inserted into those locking holes (21) in the strike piece (20) as illustrated in FIGS. 4 and 5. Each of said catch hooks (12) enters into the locking hole (21) and further into the accommodation space (22), then the catch piece (10) is pushed to move to where for the gap (13) of the catch hook (12) to snap lock the strike piece (20) so to secure the catch piece (10) to the strike piece (20), in turn, both of said first and second boards are secured to each other.

Figure 2:
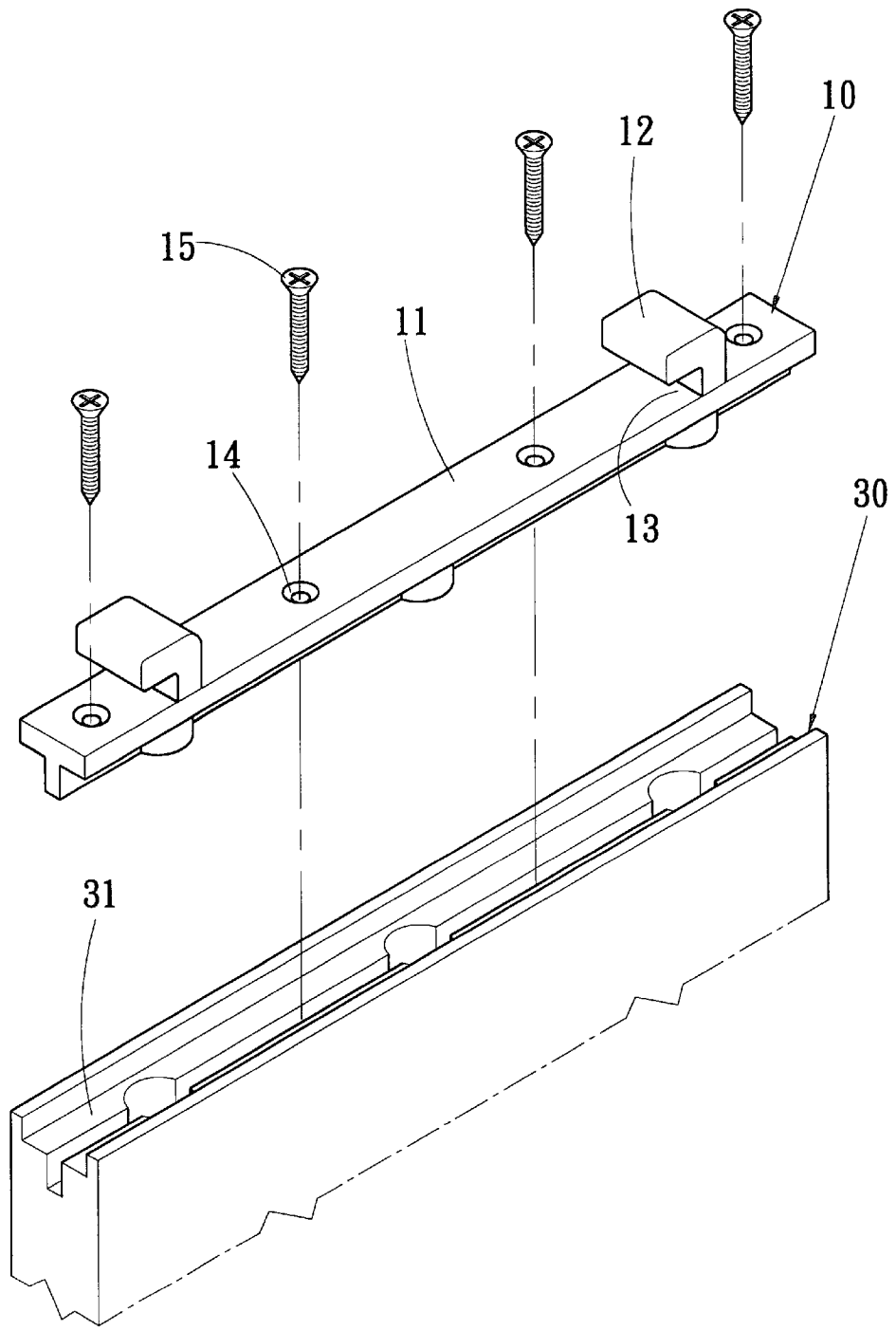
FIG. 2 is an exploded view of a catch piece incorporated into a board of the preferred embodiment of the present invention.

Referring to FIG. 2, the catch piece (10) is provided with multiples of fixation holes (14) on the catch plate (11) of the catch piece (10) so to fix it to the first board (30) by having a screw (15) to pass the fixation hole (14) and to be locked into the trough (31) in the first board.

Figure 3:
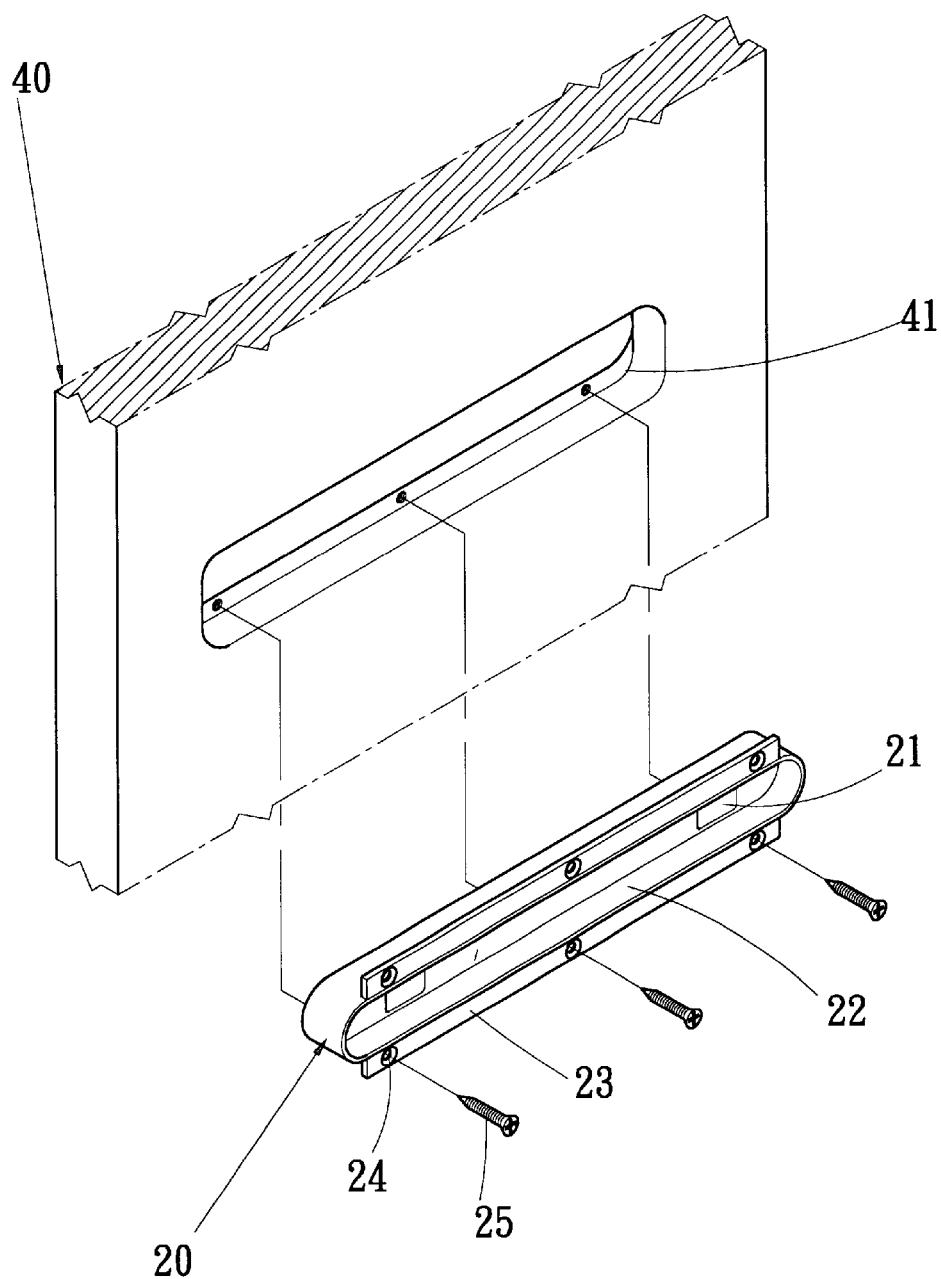
FIG. 3 is an exploded view of a strike piece incorporated into another board of the preferred embodiment of the present invention.

As illustrated in FIG. 3, a wing (23) is each respectively provided to the side edge of the accommodation space (20) in the strike piece (20) and multiples of positioning hole (24) are provided on each wing (23) to fix the strike piece (20) into the second board (40) by having a positioning screw (25) to pass the positioning hole (24) and to be locked into the second board (40).

Figure 6:
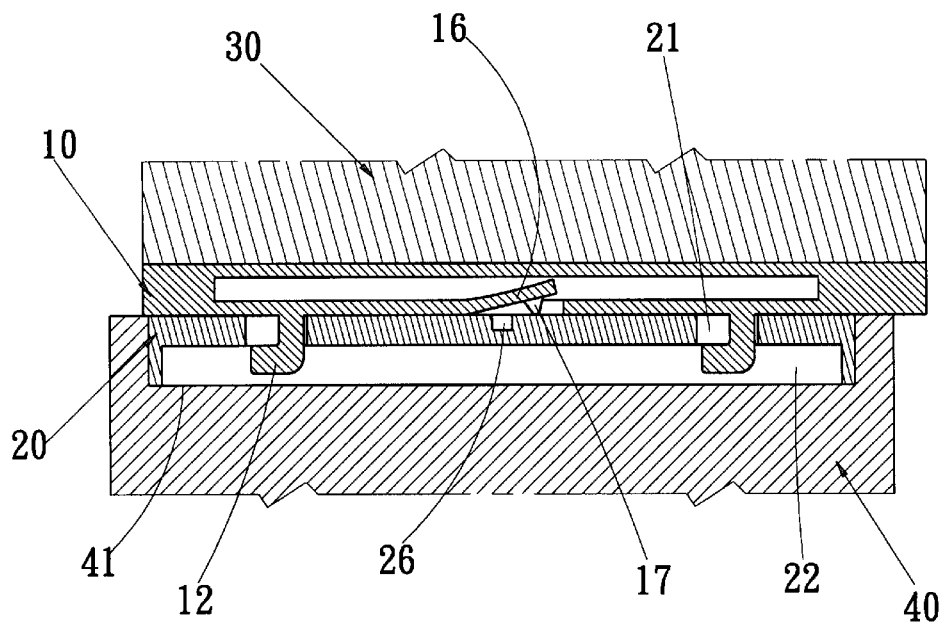
FIG. 6 is a sectional view of another preferred embodiment of the present invention.
Figure 7:
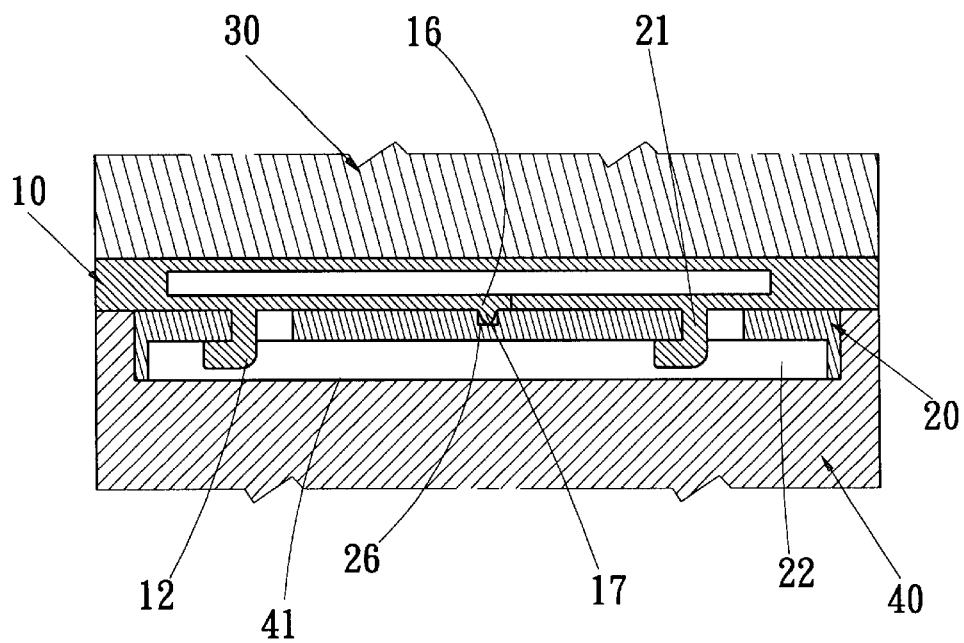
FIG. 7 is another sectional view of another preferred embodiment of the present invention.

Referring to FIGS. 6 and 7, an retractable catch (16) is provided on the catch piece (10) and a catch tenon (17), at the terminal of the retractable catch (16) so that when the catch piece (10) is incorporated with the strike piece (20), the catch tenon (17) on the retractable catch (16) is locked in a locking slot (26) provided in the strike piece (20) for an even secured combination between the catch piece (10) and the strike piece (20) by means of inserting the tenon (17) into the locking slot (26) and the catch hook (12) into the locking hole (21).

Figure 8:
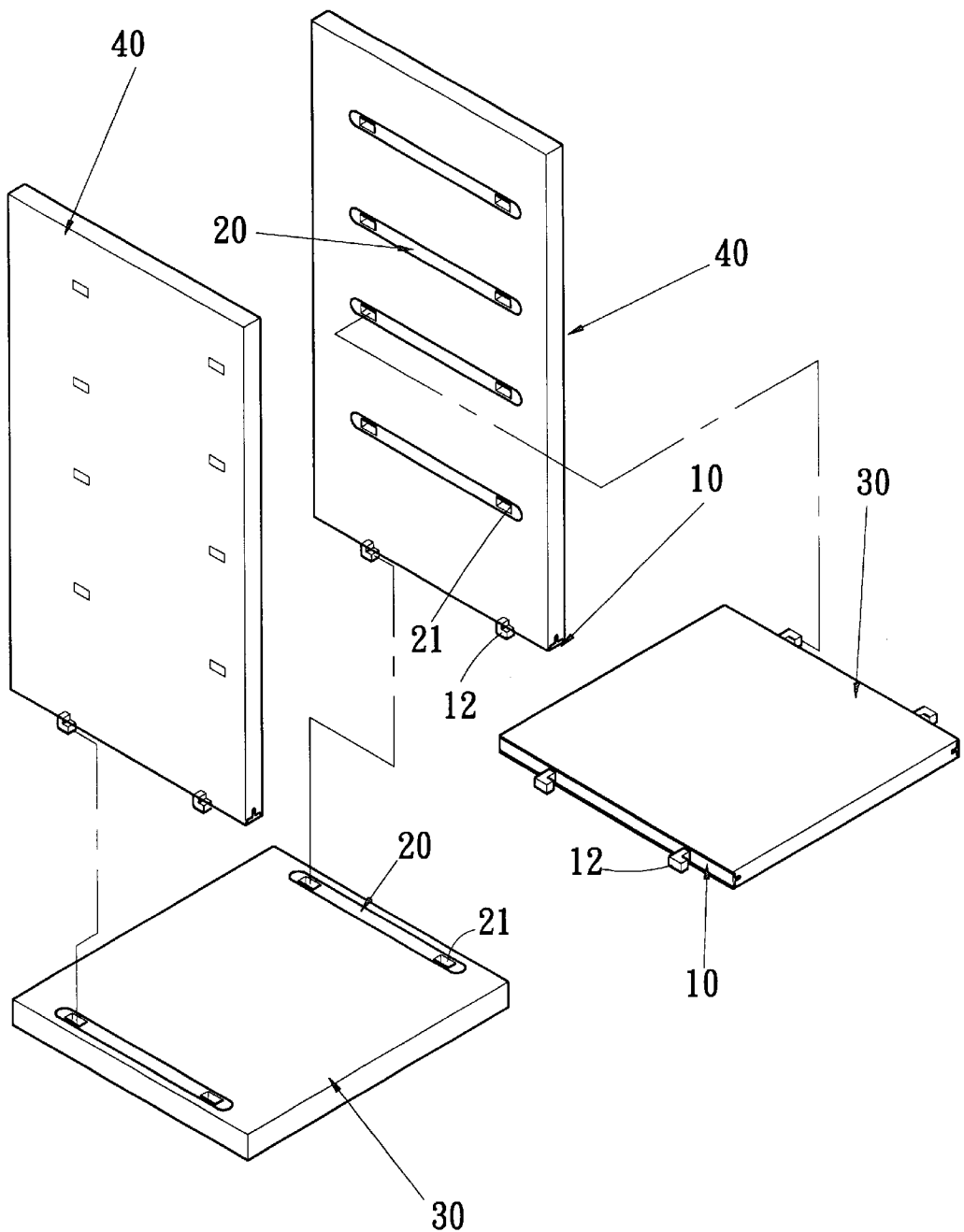
FIG. 8 is a schematic view showing a mounting direction for the present invention.
Figure 9:
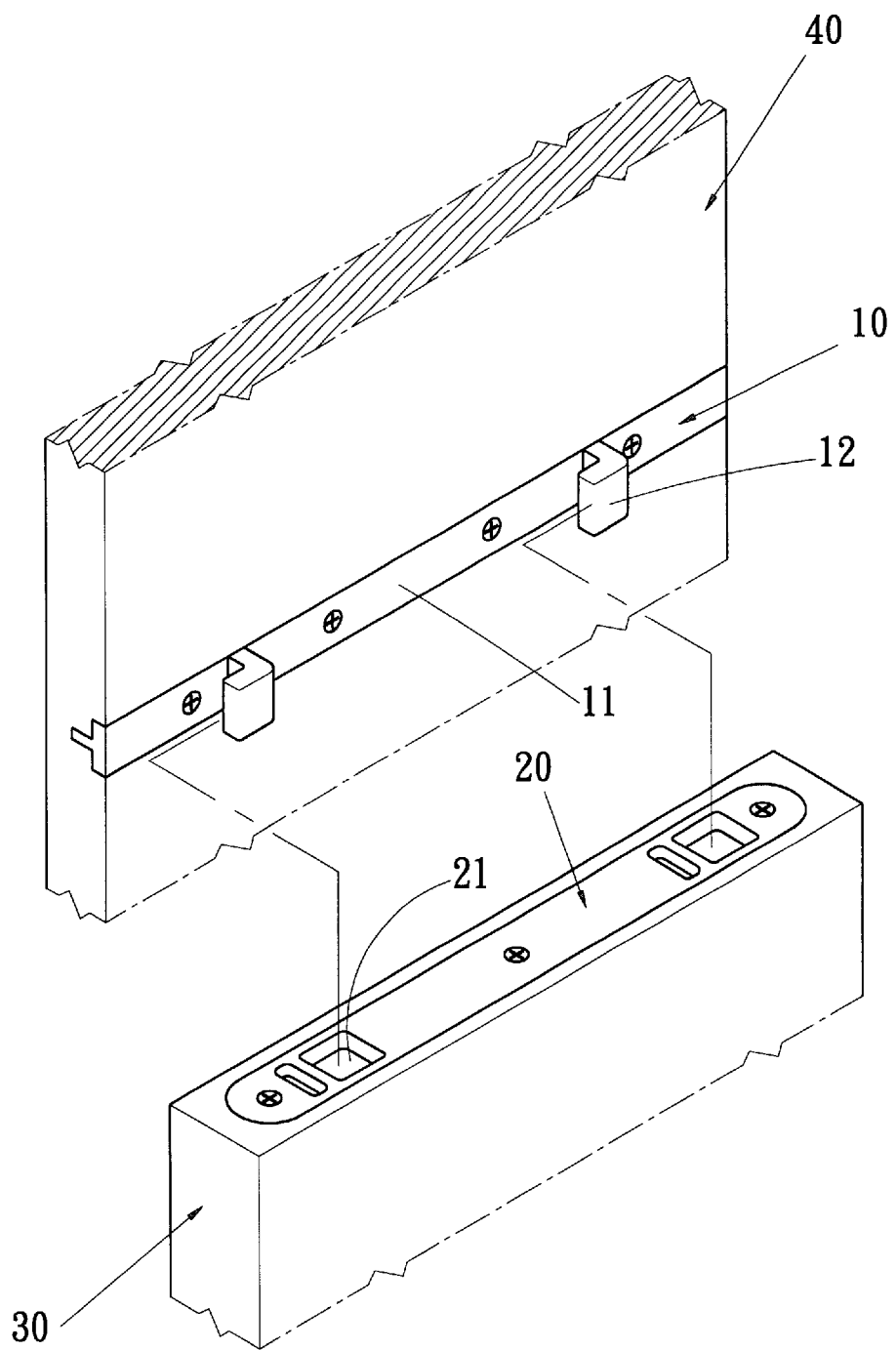
FIG. 9 is a schematic view showing another mounting direction of the present invention.

Now referring to FIGS. 8 and 9, the mounting of the present invention is free of restriction in direction. The catch piece (10) and the strike piece (20) can be respectively mounted to the first board (30) and the second board (40) laterally or vertically by having the catch hook (12) from the catch piece (10) to be inserted into the locking hole (21) in the strike piece (20) to allow the first board (30) and the second board (40) to be laterally or vertically secured for the purpose of combinations of box, cabinet or partitioned spaces. Furthermore, the combined catch piece (10) and the strike piece (20) can be knocked down for alternative combination. For storage or handling, the first board (30) and the second board (40) are disengaged by removing the insertion of the catch piece (10) from the strike piece (20) for the catch hook (12) of the catch piece to clear away from the locking hole (21) in the strike piece (20), thus to separate the first board (30) from the second board (40).

Figure 10:
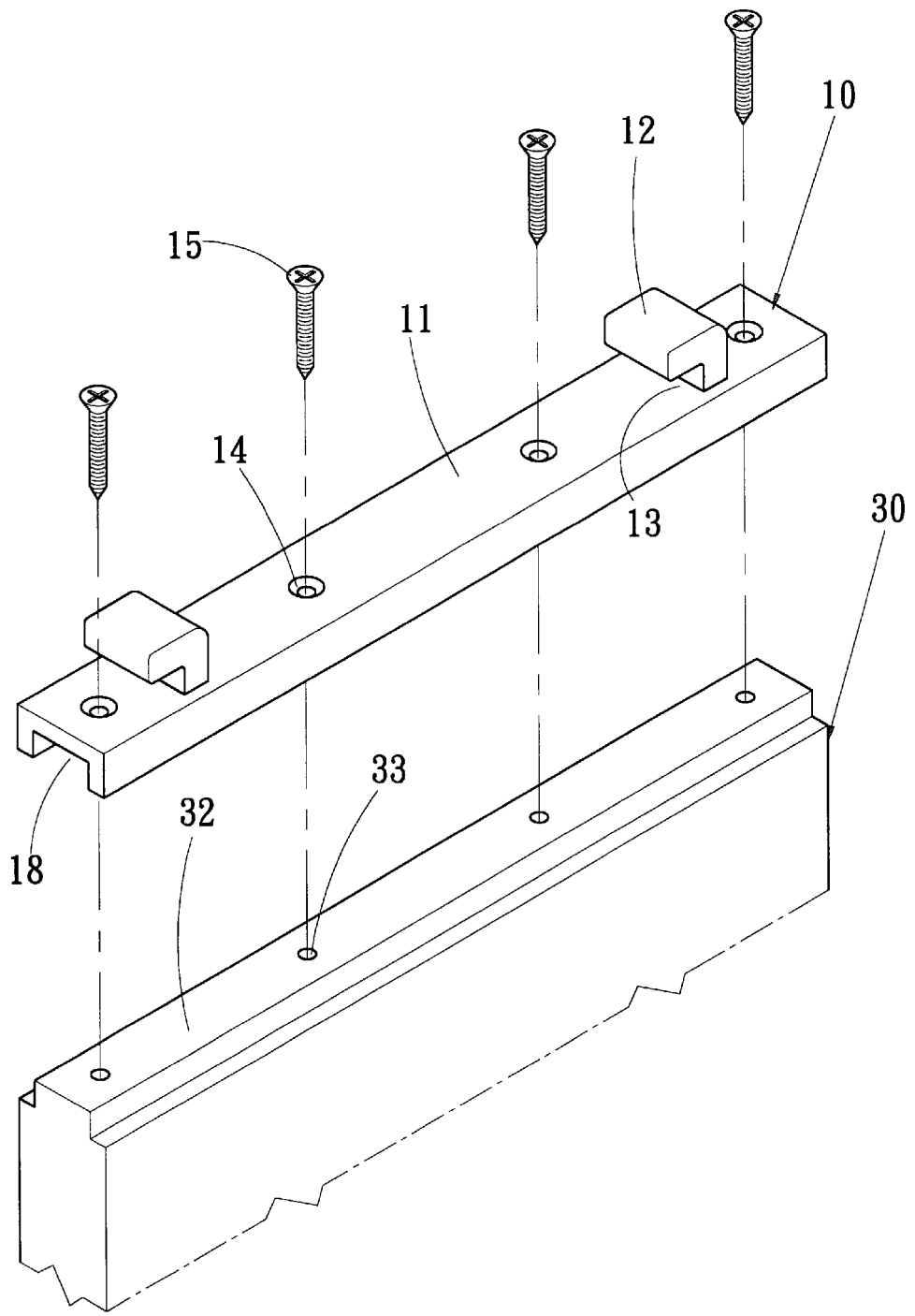
FIG. 10 is a schematic view showing another mounting direction yet of the present invention.

Referring to FIG. 10, a lower slot (18) in shape of a staple is provided below the catch piece (10) while an upper catch base (32) is provided on the first board (30) in relation to the lower slot (18), and an inner screw hole (33) is provided on the upper catch base (32) in relation to the fixation hole (14); and the catch piece (10) being fixed to the first board (30) by having the lower catch slot (18) to be incorporated with the upper catch base (32) on the first board (30) and the screw (15) penetrating the fixation hole (14) and being locked in the inner screw hole (33).

Figure 11:
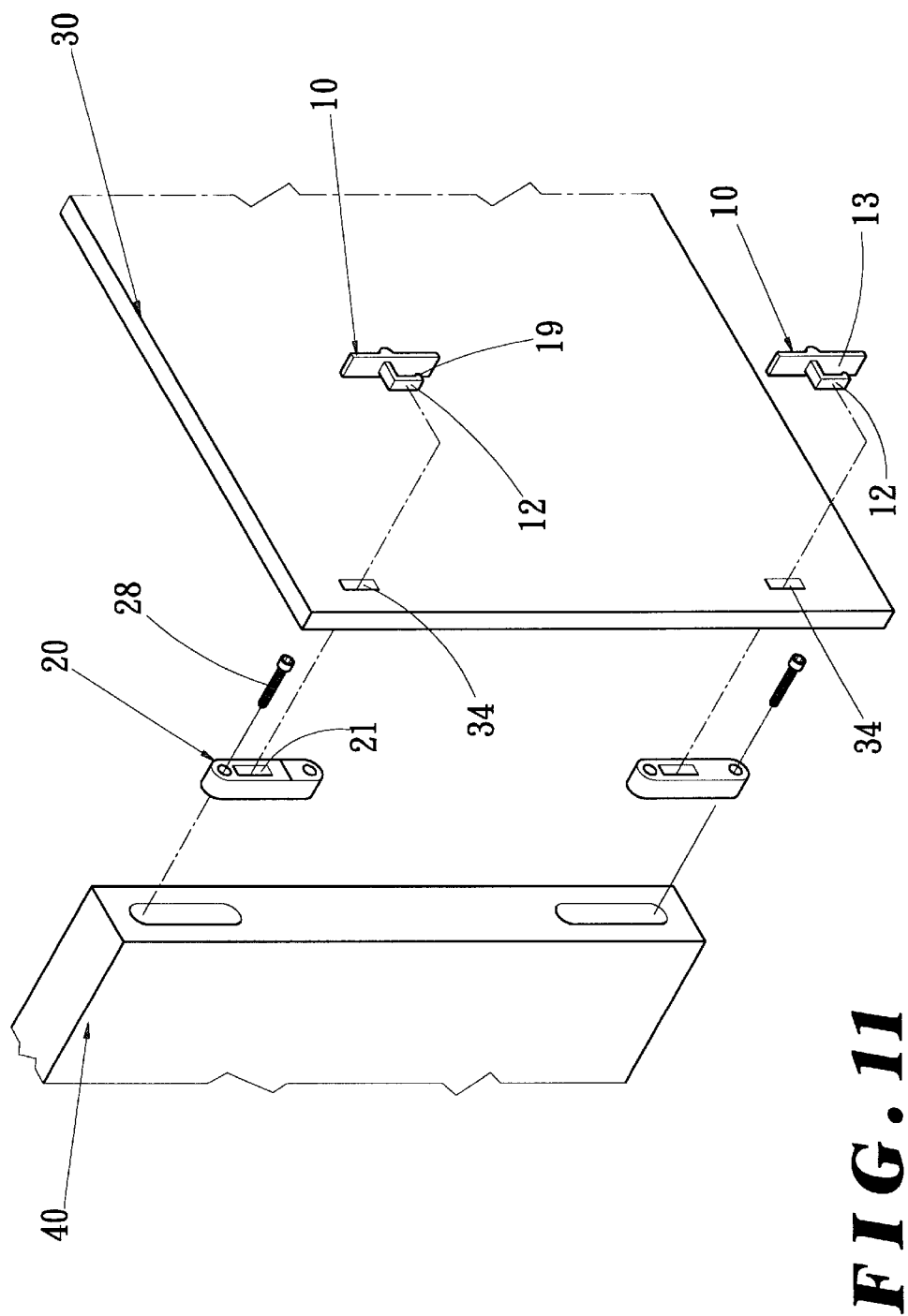
FIG. 11 is a view showing another preferred embodiment yet of the present invention.
Figure 12:
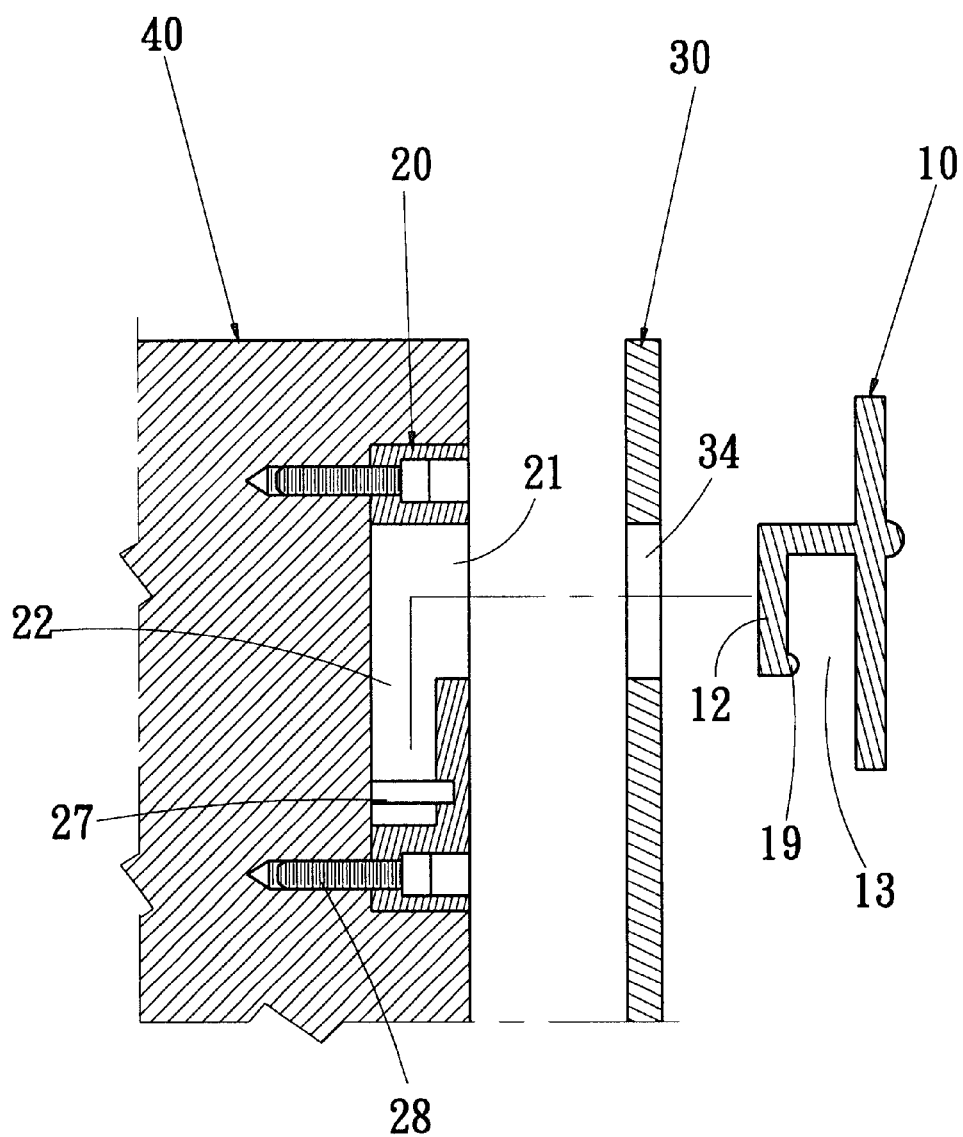
FIG. 12 is a sectional view showing the preferred embodiment illustrated in FIG. 11.
Figure 13:
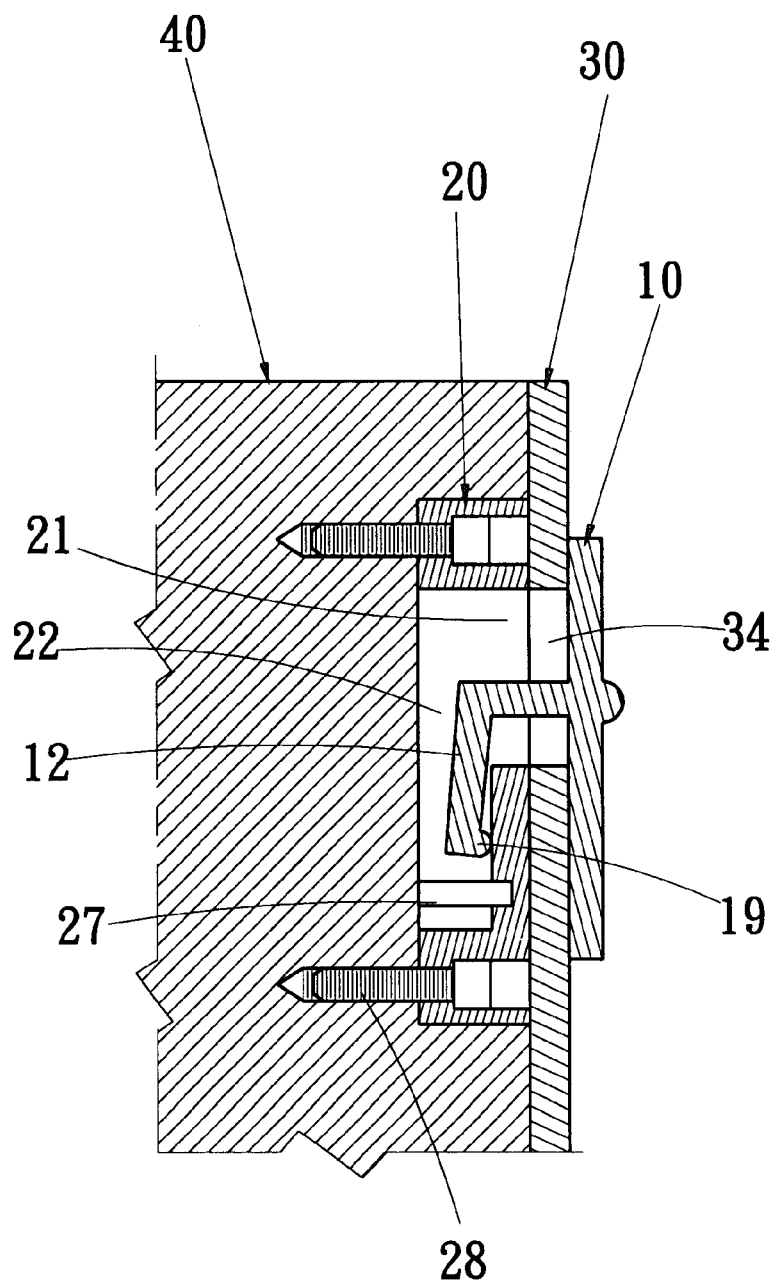
FIG. 13 is a sectional view showing an assembly of the preferred embodiment illustrated in FIG. 11.
Figure 14:
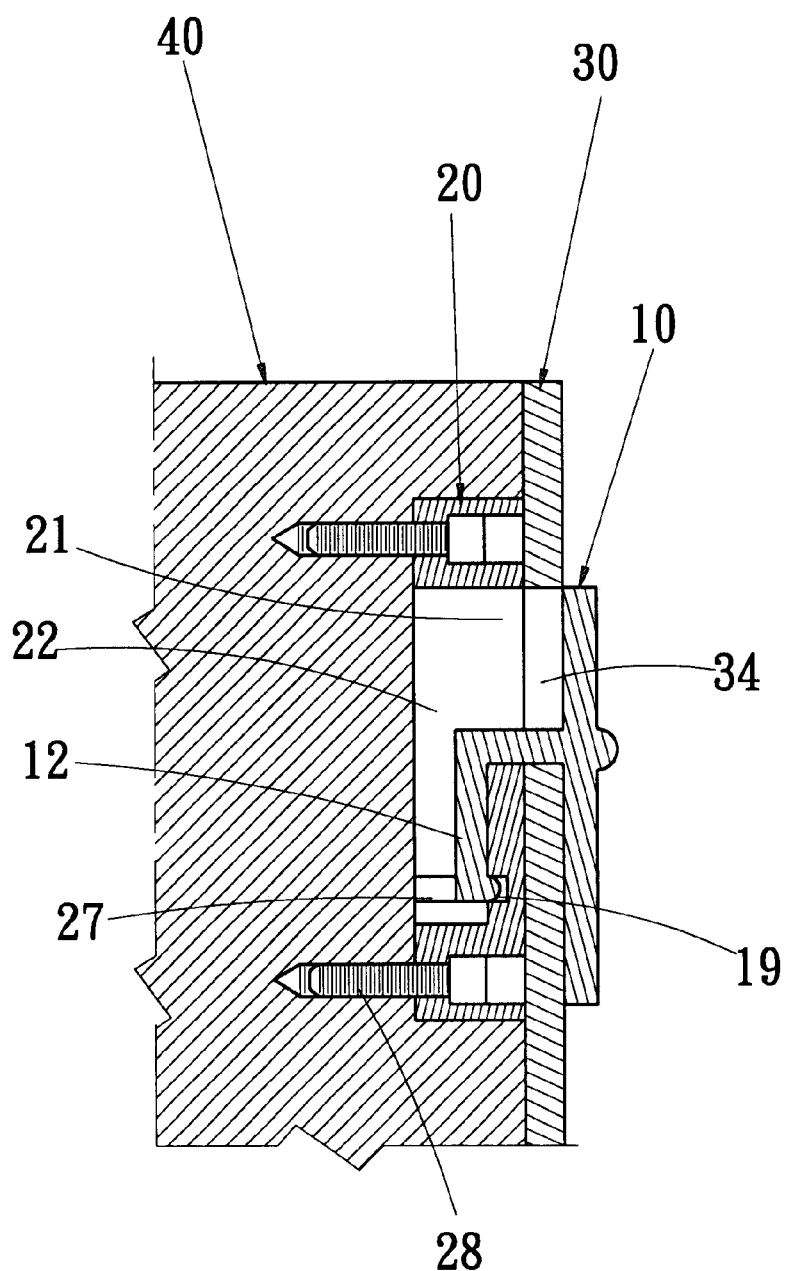
FIG. 14 is a sectional view showing another assembly of the preferred embodiment illustrated in FIG. 11.

As illustrated in FIG. 11, for a configuration of a single insertion to engage the catch piece (10) into the strike piece (20). Within a bolt (28) is used to lock the strike (20) to the second board (40) and a recess (27) is provided below the accommodation space (22) in the strike piece (20) as illustrated in FIG. 12. The catch piece (10) with its catch hook (12) penetrates the through hole (34) in the first board (10) and enters into the locking hole (21) in the strike piece (20) to have the gap (13) of the catch hook (12) of the catch piece (10) to clamp the first board (30) and the second board (40) as illustrated in FIG. 13; finally, the catch piece (10) is pushed downward to allow a lip (19) curved from and below the catch hook to be inserted into the recess (27) in the strike piece (20) as illustrated in FIG. 14, thus to tightly secured both of the first board (30) and the second board (40) to each other.

As disclosed above, the present invention for securing both boards to each other by means of inserting a catch piece into a strike piece and separate both boards from each other by disengaging the insertion of the catch piece from the strike piece; providing easy and fast combination of both boards by having catch hooks from the catch piece to be fixed in those locking holes in the strike piece; and permitting both boards can be separated for alternative combination or for storage and handling meets elements of a utility patent. Therefore, this application for a utility patent is duly filed accordingly.

I claim:

1. A combination board structure comprising at least one catch piece and a strike piece; wherein, the catch piece comprising a catch plate with at least two catch-hooks on the catch plate and the catch plate is fixed in a trough in a first board;

the strike piece comprises a plate having an accommodation space containing at least two locking holes to mate the catch-hooks in the catch plate to be incorporated into a second board in relation to the first board; and the catch-hooks on the catch plate in the first board being inserted into the locking holes in the strike plate in the second board for the catch piece to be secured to the second board, and thus both of the first and the second boards being secured to each other in position; and said combination board surface structure further comprising a retractable catch on the catch piece and a catch tenon on the terminal of the catch piece for the catch tenon from the catch piece to be inserted into a locking slot in the strike piece for both of the catch piece and the strike piece to be more firmly secured to each other by the mated tenon and slot as well as the catch hook and the locking hole, with the proviso that said retractable catch is located on said catch piece between said at least two catch-hooks.

* * * * *